United States Patent
Kossentini et al.

[11] Patent Number: 5,890,102
[45] Date of Patent: Mar. 30, 1999

[54] JOINTLY OPTIMIZED SUBBAND CODING SYSTEM AND METHOD

[75] Inventors: Faouzi Kossentini, Vancouver, Canada; Mark J.T. Smith, Atlanta, Ga.

[73] Assignee: Georgia Tech Research Corporation, Atlanta, Ga.

[21] Appl. No.: 736,191

[22] Filed: Oct. 24, 1996

Related U.S. Application Data

[60] Provisional application No. 60/006,056 Oct. 24, 1995.
[51] Int. Cl.$^6$ ................................................. H04N 7/12
[52] U.S. Cl. ................................. 702/181; 348/398
[58] Field of Search ................................. 364/554, 514 A; 382/240, 251, 260, 253; 348/398, 414, 417, 419, 418, 409, 395, 413, 415, 384, 405

[56] References Cited

U.S. PATENT DOCUMENTS

| | | | |
|---|---|---|---|
| 5,241,535 | 8/1993 | Yoshikawa | 370/60 |
| 5,298,896 | 3/1994 | Lei et al. | 341/51 |
| 5,309,232 | 5/1994 | Hartung et al. | 348/384 |
| 5,485,210 | 1/1996 | Lim et al. | 348/409 |
| 5,606,370 | 2/1997 | Moon | 348/390 |
| 5,631,978 | 5/1997 | Galand et al. | 382/240 |

*Primary Examiner*—James P. Trammell
*Attorney, Agent, or Firm*—Thomas, Kayden, Horstemeyer & Risley

[57] ABSTRACT

A subband coder with jointly optimized multistage residual quantizers and entropy coders for image coding which allows the subband coder to exploit both linear and nonlinear dependencies that may exist within and across the subbands. Both inter- and intra-band dependencies are simultaneously exploited via jointly optimizing the subband coders and entropy coders in an entropy constrained optimization framework involving rate, distortion and complexity. The multistage quantization structure and the effectiveness of the statistical modeling algorithm results in an attractive balance among reproduction quality, rate and complexity.

41 Claims, 2 Drawing Sheets

JOINTLY OPTIMIZED SUBBAND CODING SYSTEM AND METHOD

This application claims priority to and the benefit of the filing date of copending and commonly assigned provisional application entitled SUBBAND COMPRESSION SYSTEM AND METHOD, assigned Ser. No. 60/006,056, and filed Oct. 24, 1995.

FIELD OF THE INVENTION

The present invention relates generally to subband coding and, more specifically, to a joint optimization entropy constrained subband quantization design algorithm which can be used to code any image sequence.

BACKGROUND OF THE INVENTION

Subband coding is one of the most popular signal coding techniques known to date. The conventional subband coding paradigm consists of first splitting the input signal into frequency bands, and then coding the subbands. Individual subband coding systems differ typically in the choice of subband configuration, quantizers, entropy coders and bit allocation strategy. Much of the performance gain associated with subband coding may be attributed in general to the removal of linear dependencies among subband signals by the filter bank. However, additional gain may be attained by recognizing that the subband signals are generally not statistically independent. Therefore, quantizers and entropy coders that are optimized to the statistics of all subband signals can lead to a significant improvement in rate-distortion performance.

Previously, a generalized subband decomposition framework that provides a way of determining necessary conditions for the optimality of entropy constrained subband quantizers given an arbitrary set of filters and an arbitrary decomposition structure was proposed in F. Kossentini, W. Chung and M. Smith, "Subband Image Coding With Intra- And Inter-Band Subband Quantization," in *Asilomar Conf. on Signals, Systems and Computers,* (Pacific Grove, Calif., November 1993). Subband quantizers and entropy coders were designed jointly to minimize the average distortion subject to a constraint on the output rate of the system. The subband coder of the present invention presents a joint optimization entropy constrained subband quantization design algorithm with emphasis on complexity reduction that leads to improved complexity-performance tradeoffs. The subband coder of the present invention exploits both linear and non-linear dependencies that may exist within and across the subbands. Both inter- and intra-band dependencies are simultaneously exploited via jointly optimizing the subband encoders, decoders, and entropy coders in an entropy constrained optimization framework involving rate, distortion and complexity.

SUMMARY OF THE INVENTION

The subband coder of the present invention provides a system and method for efficiently coding data. In the present case, the subband coding of an image sequence such as color digitized photographs, CAT scans, and video will be used as an example. This procedure, however, is not limited to image sequences and lends itself to applications with other forms of data such speech and audio. The subband coding of the present invention is accomplished by first generating a plurality of image planes from an input image sequence. A good example is the generation of Y, I, and Q image planes or Y, U, and V image planes from a color RGB image sequence by applying a coordinate transformation scheme to each RGB image. Another good example is the generation of three or four principal component image planes by applying the KL transform to a sequence of twelve multispectral images. Each image plane is then decomposed into subbands by filtering the rows and columns using a low pass filter and a high pass filter. Any well-known filter device can be used to decompose the image planes into subbands.

After filtering, the results are decimated to remove odd samples. The result for each image plane is a number of subbands that consist of coefficients or pixels. Each pixel in a subband is quantized successively using a multistage quantizer, producing a sequence of stage quantizer outputs or symbols per subband pixel. The quantization can be performed sequentially, where the decision on the output of the subject stage quantizer is made independently from decisions made in previous stage quantizers. The quantization can also be performed using dynamic multipath searching. The idea here is that instead of just choosing the best stage quantizer symbol value, we find the M best stage quantizer symbol values. A different value of M is selected for each stage quantizer and each subband pixel, based on the "goodness" of the symbol value and the value of a predetermined threshold. Then we find the path (for each subband pixel) through the sequence of stage residual quantizers that gives the lowest overall distortion. This path is often not the one obtained by simply choosing the best quantizer value at each stage.

In order to perform the entropy coding of the stage quantizer symbols for a particular pixel, other symbols corresponding to the same pixel and symbols corresponding to associated pixels are considered. The associated pixels can be adjacent to the subject pixel spatially within the same subband, and they can be adjacent to a pixel (in a different subband in the same or a different image plane) whose spatial coordinates are the same as the subject pixel's. The set of all stage quantizer symbols considered while entropy coding the subject symbol will henceforth be called the region of support. Only symbols whose values are known to the decoder (i.e., have already been coded) may be allowed to be part of the region of support.

Given a region of support, a table of conditional probabilities is located, and the subject symbol is entropy coded based on its corresponding probability in the selected table. Entropy coding the subject symbol is assigning to it a variable length codeword whose length is proportional to its conditional probability. Symbols that occur less often are assigned longer codewords and symbols that occur more often are assigned shorter codewords. The objective is to minimize the overall bit rate. Entropy coding is based on conditional probabilities taken from a table selected using a finite state machine. The probabilities are used to guide the entropy encoding stage. Thus, they have to be estimated as accurately as possible.

Accurate estimation of probabilities also allows the effective exploitation of statistical dependencies in the image planes, yielding a substantial reduction in average codeword length. The finite state machine selects one of a plurality of probability tables, each having a list of conditional probabilities (with implicit corresponding variable length codewords). The finite state machine dynamically forms a region of support for the subject pixel, and it maps the vector of values of all symbols in the region of support to a pointer value indicating uniquely the selected table. The mapping function can be generic, and it can also be optimized during the design process. The size of the selected table is always equal to the size of the output alphabet (all possible symbol values) of the stage quantizer producing the subject symbol.

A large number of symbols in the region of support can cause an exponential increase in the number of all possible vectors of symbol values, therefore the number of the probability tables must be controlled. Because memory and complexity are directly related to the number of symbols chosen, a method for choosing the best few conditioning symbols has been developed. The best few (say n) symbols are determined during the design process. The number n of symbols is determined based on approximate complexity constraints and performance requirements of the system.

There are instances when the number of symbols required to accurately condition the subject symbol is less than that of the total number of symbols available in the region of support. Thus, a step of selecting a set of symbols by using training sample data is performed. All the symbols associated with neighboring pixels, including the adjacent pixels in the same subband, the corresponding pixels in neighboring subbands of the same image plane, the corresponding pixels in a corresponding subband of a different image plane, and the adjacent pixels in different subbands of a different image plane, can be analyzed.

Stage quantizer output symbols are conditioned by selecting a particular probability table for the subject symbol based upon a predetermined set of optimal conditioning symbols. A vector of values of this predetermined set of optimal conditioning symbols is mapped using a nonlinear mapping function to a state. The nonlinear mapping function is designed using the pairwise nearest neighbor (PNN) algorithm, which minimizes the number of states subject to a constraint on average bit rate. The finite state machine formulates states and probability tables which are supplied to the entropy coder. Stage quantizer output symbols are then entropy coded using corresponding conditional probabilities in the selected table. An analysis section splits the input image plane into a number of subbands.

Individual pixels in the subband are quantized using a multistage vector quantization operation which outputs a sequence of stage quantizer output symbols to an entropy coder. The entropy coder assigns to each stage quantizer output symbol a variable length codeword based upon the probability of the subject symbol in the selected table. The table is selected using a finite state machine where decisions are based on analyzing an optimized number of symbols in the region of support.

The finite state machine locates the appropriate probability table for each subject symbol based upon the current state. States are determined by analyzing the output of the nonlinear mapping function given a vector of values of optimal conditioning symbols.

Another aspect of the present invention is the nonlinear mapping function that maps all possible vectors of values of optimal conditioning symbols to a much smaller subset of states. While training is usually conducted using several image sequences, there would still be some states that were never visited, therefore, tables will not exist for these states. The nonlinear mapping function ensures that any state selected will point to a non-empty probability table.

The invention has numerous advantages, a few of which are delineated hereafter, as merely examples.

An advantage of the present invention is that it provides an improved jointly optimized subband coder so that the average distortion introduced by the subband quantizers is minimized subject to a constraint on the output rate of the subband encoder.

Another advantage of the present invention is the ability to exploit all statistical dependencies within an image sequence.

Another advantage of the present invention is that the effectiveness of the statistical modeling algorithm allows an good balance to be achieved among reproduction quality, rate and complexity.

Another advantage of the present invention is that it provides a mapping function that maps a would-be large number of states to a much smaller subset and ensures that any state landed upon will point to a non-empty probability table.

Other objects, features, and advantages of the present invention will become apparent to one with skill in the art upon examination of the following drawings and detailed description. It is intended that all such additional objects, features, and advantages be included herein within the scope of the present invention, as defined in the appended claims.

BRIEF DESCRIPTION OF THE DRAWINGS

The present invention, as defined in the claims, can be better understood with reference to the following drawings. The drawings are not necessarily to scale, emphasis instead being placed on clearly illustrating principles of the present invention.

DETAILED DESCRIPTION OF THE PREFERRED EMBODIMENT

Figure 1:
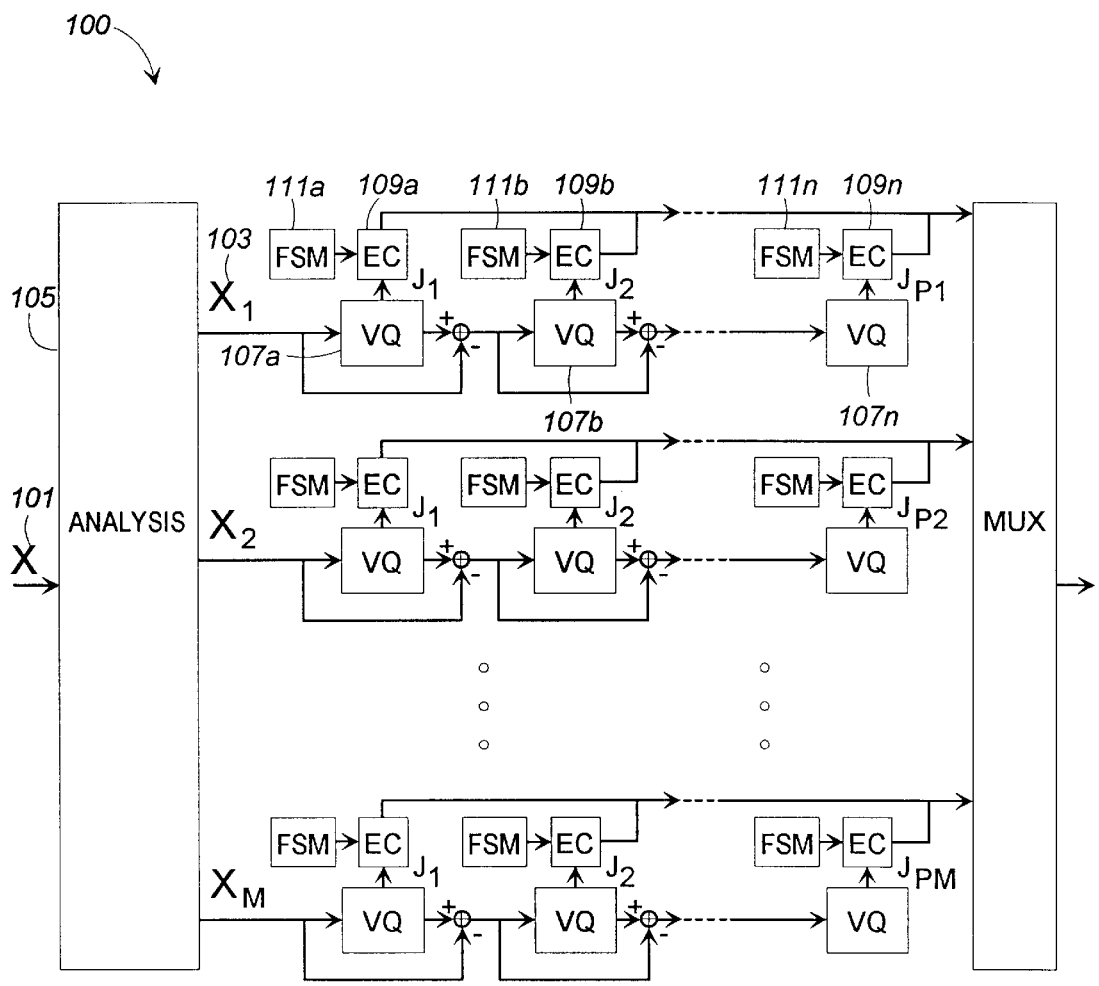
FIG. 1 is a view illustrating the subband coder of the present invention.

With reference now to the figures wherein like reference numerals designate corresponding parts throughout the several views, FIG. 1 is a view illustrating the subband coder 100 of the present invention.

ARCHITECTURE

Decomposition. Vector Quantization and Entropy Coding

An image sequence X 101 is input to analysis component 105. Analysis component 105 contains logic designed for decomposing an image sequence X 101 into M subbands, where M is the number of subband images. The analysis component transforms the image sequence X 101 into image planes and decomposes each of the image planes into subbands by using 1-D, 2-D, or 3-D filter banks. Filter bank implementations can be performed using separable filter banks or nonseparable filter banks. Filter bank implementations are familiar to those acquainted with the published signal processing literature on filter banks.

After analysis by analysis component 105, the subbands are quantized and entropy coded. The preferred embodiment as shown uses a cascade of stage vector quantizers 107a, 107b, 107n, and known as residual vector quantizers. The vector dimension for each quantizer is arbitrary. Using vectors of dimension 1, which is scalar quantization, has been shown to work very well in practice. The choice of quantizers is not limited to residual quantizers 107a, 107b, 107n as shown in FIG. 1. Any quantizer with a successive refinement property may be used in lieu of the residual vector quantizers shown in FIG. 1. This should be obvious to one skilled in the area of data compression.

Subband quantization is performed on each subband. This discussion will address one such subband, X1 103 and the operation performed on one pixel (or vector of pixels). All subbands are operated upon in a similar manner.

A pixel (or vector) in subband X1 103 is input to a stage vector quantizer 107a which contains logic designed to quantize the pixel (or vector) using a codebook of scalar values (or code vectors). A residual scalar (or vector) defined as the difference between the input and the quantized input is computed and fed to the next stage quantizer 107b. With each successive quantizer stage, the degree of quantization accuracy for each pixel (or vector) improves. Each stage quantizer (for example 107a, 107b, 107n) also provides an input value (fixed length codeword) of the stage quantizer symbol to the entropy coder. For example, 107a provides a stage quantizer codeword as input to entropy coder 109a, 107b provides a stage quantizer codeword as input to entropy coder 109b, and so on.

The mechanism for encoding the fixed length output codewords of the stage quantizers involves a finite state machine and a stage entropy coder. This mechanism is applied to each stage quantizer for each pixel in each subband. The quantizers, entropy coders, and finite state machine are designed jointly to maximize overall performance. Since the functionality of the stage codeword encoding mechanism is the same for each stage quantizer, this discussion will address the mechanism for encoding the fixed length output codewords produced by 107.

The fixed length output codewords of the stage quantizers 107a, 107b, 107n are assigned variable length codewords by the stage entropy coders 109a, 109b, 109n respectively. The lengths of these variable length codewords are defined by the probabilities associated with the respective fixed length codewords. For each stage entropy coder 109a, 109b, 109n, the probabilities are determined by the associated finite state machines, 111a, 111b, 111n, respectively.

The probability estimates provided by the finite state machine are conditional probability estimates, which are more accurate than non-conditional ones. The conditioning is based (indirectly) on previously quantized fixed length stage codeword values taken from the region of support (i.e., from previous stages, from stages in neighboring pixel/vector locations within the subband, from stages in related pixel/vector locations in other subbands, and from stages in related pixel/vector locations in other image planes). The finite state machine 111a, 111b, and 111n, provides conditional probability estimates for entropy coders 109a, 109b, and 109n, respectively. Further elaboration is given in the section entitled Finite State Machine.

Finite State Machine

Finite state machine 111a contains logic designed to generate a state (with associated probability table) which is used to condition the stage entropy coder 109a.

Figure 2:
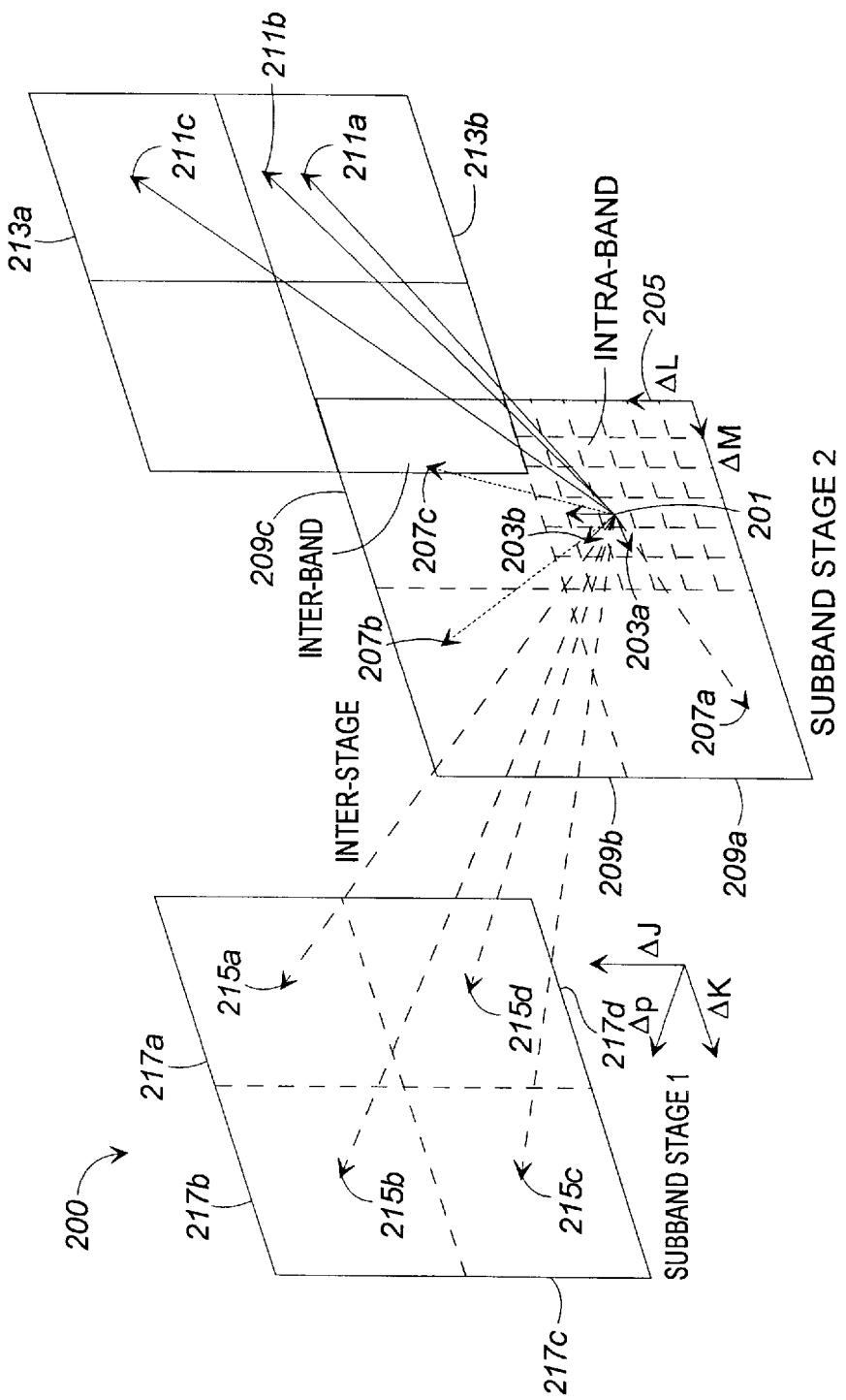
FIG. 2 is a view illustrating the decomposed subbands showing all symbols available for consideration by the finite state machine of FIG. 1.

Referring now to FIG. 2, a view of the decomposed subbands 200 and pixels in the region of support available for consideration by the finite state machine is illustrated. Finite state machine 111a contains logic designed to form a state for a subject fixed length stage codeword for a stage quantizer symbol for a pixel/vector 201 based on previously coded stage codewords corresponding to adjacent pixels/vectors 203 within their own subband 205, in corresponding pixels/vectors 207 in neighboring subbands 209, in corresponding pixels/vectors 211 across image planes 213 and corresponding pixels/vectors 215 across quantizer stages 217.

For illustration simplicity, FIG. 2 shows only two stages, two color planes, and four subbands per stage. However, the region of support associated with the finite state machine typically includes many stages, planes, and subbands, depending on the type of image being coded. The set of all possible combinations of fixed length stage codeword (symbol) values is the largest set of states that can be produced by the finite state machine. The actual number of states, with corresponding non-empty probability tables, is determined during the design process using the PNN algorithm.

The PNN algorithm designs a nonlinear mapping function that substantially reduces the number of allowed states. The precise distribution of conditioning symbols within and across subbands, across stages, and across planes varies from stage to stage and is specified during the system design process. In the system design procedure, a training set of representative image sequences is used. The few most significant conditioning symbols in the predetermined region of support for each quantization stage is determined according to the training set. A nonlinear mapping function (represented uniquely by a mapping table), that maps the state space consisting of all possible combinations of optimal conditioning symbol values to a few states (or conditioning states) with associated non-empty tables, is then obtained using the PNN algorithm. The PNN algorithm minimizes the overall entropy subject to a limit on the total number of conditional probabilities administered by the finite state machine 111a.

Once selected and conditioned, the subject stage quantizer symbols corresponding to pixel 201 are entropy coded by the stage entropy coder 109, each stage containing logic designed for assigning a variable length codeword, based upon an associated conditional probability in a particular optimized table for subject stage quantizer for subject pixel 201. The conditional probabilities are then estimated for each state by keeping a running count of the number of occurrences of each stage quantizer symbol value (or fixed length codeword) for each conditioning state. The logic for estimating these conditional probabilities involves using a simple counter.

Decoding and Recomposition

At the receiver, the previously coded stage quantizer symbols are known. This information allows the conditioning state to be identified at the receiver end. The receiver also keeps a running count of the number of occurrences of the stage quantizer symbol values for each conditioning state. Thus the same conditional probabilities used for encoding are available to the receiver for decoding. A direct table look up is then performed using that probability table which yields the stage quantizer symbol value (or fixed length codeword), identifying uniquely the associated stage reconstruction value. The stage decoder outputs are then added, producing an approximate value for the subject pixel. This procedure allows all the subband images to be reconstructed. Subbands are then recombined by a synthesis filter bank (which represents the inverse of the analysis process) cascaded (if applicable) by the inverse image plane transformation.

The elements of the subband coding system, as described previously, can be implemented in software, firmware, hardware, or a combination thereof.

When implemented in software, the subband coding system can be stored and transported on any computer readable medium for use by or in connection with a computer-related system or method. In the context of this document, a computer readable medium is an electronic, magnetic, optical, or other physical device or means that can contain or store a computer program for use by or in connection with a computer-related system or method.

OPERATION

Decomposition, Vector Quantization and Entropy Coding

An image sequence X 101 is input to analysis component 105. Analysis component 105 transforms image sequence X 101 and decomposes the resulting image planes into a number of subband images. The transformation can be a color coordinate conversion as it can be a KL transformation of multispectral image sequences into a small number of image planes. The analysis decomposition can be implemented in many ways by using 1-D, 2-D, or 3-D filter banks. Filter bank implementations can be performed using separable filter banks or non separable filter banks. Such implementations are familiar to those acquainted with the published signal processing literature on filter banks. The analysis decomposition can be applied to each image plane individually or it can be applied to groups of image planes where 3-D filter banks are applied to the spatial and temporal axes.

After analysis by analysis component 105, the subbands are quantized and entropy coded using a cascade of stage vector quantizers 107a, 107b, 107n, also known as residual vector quantizers; and entropy coders 109a, 109b, 109n. The choice of quantizers is not limited to residual quantizers 107a, 107b, 107n as shown in FIG. 1. Any quantizer with a successive refinement property may be used in lieu of the residual vector quantizers shown. This should be obvious to one skilled in area of data compression.

Quantization is then performed on each subband. This discussion will address one such subband, X1 103 and the operation performed on one pixel (or vector). All subbands are operated upon in a similar manner. A pixel (or vector) in subband X1 103 is input to stage vector quantizer 107a which quantizes the pixel (or vector) using a codebook of scalar values (or code vectors). A residual defined as the difference between the input and the quantized input is calculated and fed to the next stage quantizer 107b. With each successive quantizer stage, the degree of quantization accuracy for each pixel (or vector) improves. Each stage quantizer (for example 107a, 107b, 107n) also provides an output to entropy coder 109. For example, 107a provides a stage fixed length codeword as input to 109a, 107b provides a stage fixed length codeword as input to 109b, and so on. Sequential searching is assumed in the above description, but the stage vector quantizer can also be searched using dynamic multipath searching as discussed earlier.

The mechanism for encoding the fixed length output codewords of the stage quantizers involves a finite state machine 111 and stage entropy coder 109. This mechanism is applied to each stage quantizer for each pixel/vector in each subband. The quantizer 107, entropy coder 109, and finite state machine 111 are designed jointly for all stage quantizers in all subbands. Since the functionality of the stage symbol value (or fixed length codeword) encoding mechanism is the same for each stage quantizer, this discussion will address the mechanism for the fixed length output codewords produced by 107.

The fixed length output codewords of the stage quantizers 107a, 107b, 107n are assigned variable length codewords by the stage entropy coders 109a, 109b, 109n, respectively. The lengths of these variable length codewords are determined by the probabilities associated with the respective fixed length codewords. For each stage entropy coder 109a, 109b, 109n, the probabilities are determined using the associated finite state machine, 111a, 111b, 111n, respectively.

The probability estimates provided by the finite state machine are conditional probability estimates which are more accurate than non-conditional estimates. The conditioning is based (indirectly) on previously encoded stage quantizer output symbol values taken from the region of support (i.e., from previous stages, from stages in neighboring pixel/vector locations within the subband, from stages in related pixel/vector locations in other subbands, and from stages in related pixel/vector locations in other image planes. Finite state machine 111a, 111b, and 111n, provides conditional probability estimates for stage entropy coders 109a, 109b, and 109n respectively. Further elaboration is given in the section entitled Finite State Machine.

Finite State Machine

Finite state machine 111a generates a state (with associated probability table) which is used to condition the stage entropy coder 109a.

Referring now to FIG. 2, a view of the decomposed subbands 200 and pixels in the region of support available for consideration by the finite state machine is illustrated. Finite state machine 111a forms a state for a subject fixed length stage codeword for a stage quantizer symbol for a pixel/vector 201 based on previously coded stage codewords corresponding to adjacent pixels/vectors 203 within their own subband 205, in corresponding pixels/vectors 207 in neighboring subbands 209, in corresponding pixels/vectors 211 across image planes 213 and corresponding pixels 215 across quantizer stages 217.

For illustration simplicity, FIG. 2 shows only two stages, two image planes, and four subbands per stage. However, the region of support associated with the finite state machine typically includes many stages, planes, and subbands, depending on the type of image being coded. The set of all possible combinations of fixed length stage codeword (symbol) values is the largest set of states that can be produced by the finite state machine. The actual number of states, with corresponding non-empty probability tables, is determined during the design process using the PNN algorithm.

The PNN algorithm designs a nonlinear mapping function that substantially reduces the number of allowed states. The precise distribution of conditioning symbols within and across subbands, across stages, and across planes varies from stage to stage and is specified during the system design process. In the system design procedure, a training set of representative image sequences is used. The few most significant conditioning symbols in the predetermined region of support for each quantization stage is determined according to the training set. A nonlinear mapping function (represented uniquely by a mapping table), that maps the state space consisting of all possible combinations of optimal conditioning symbol values to a few states (or conditioning states) with associated non-empty tables, is then obtained using the PNN algorithm. The PNN algorithm minimizes the overall entropy subject to a limit on the total number of conditional probabilities administered by the finite state machine 111a.

Once selected and conditioned, the subject stage quantizer symbols corresponding to the pixel 201 are entropy coded by the stage entropy coder 109, each stage assigning a variable length codeword, based upon an associated conditional probability in particular optimized table for subject stage quantizer for subject pixel 201. The conditional probabilities are then estimated for each state by keeping a running tab of the number of occurrences of each stage quantizer symbol value (or fixed length codeword) for each conditioning state. The logic for estimating these conditional probabilities involves using a simple counter.

Decoding and Recomposition

At the receiver, the previously coded stage quantizer symbols are known. This information allows the conditioning state to be identified at the receiver end. The receiver also keeps a running tab of the number of occurrences of the stage quantizer symbol values for each conditioning state. Thus the same conditional probabilities used for encoding are available to the receiver for decoding. A direct table look up is then performed using that probability table which yields the stage quantizer symbol value (or fixed length codeword), identifying uniquely the associated stage reconstruction value. The stage decoder outputs are then added, producing an approximate value for the subject pixel. This procedure allows all the subband images to be reconstructed. Subbands are then recombined by a synthesis filter bank (which represents the inverse of the analysis process) cascaded (if applicable) by the inverse image plane transformation.

It will be obvious to those skilled in the art that many modifications and variations may be made to the preferred embodiments of the present invention, as set forth above, without departing substantially from the principles of the present invention. For example, it is possible to implement the present invention using a single image plane such as that generated from a monochrome image. It is possible to use any type of subband decomposition technique (such as DCT and other block transforms, Laplacian pyramid decompositions, and conventional subband filter banks) to convert the input image plane into one or more subbands. It is also possible to use any successively refinable quantizer (such as tree-structured vector quantizers, bit plane encoders, and trellis coders) to supply values to the entropy coder, while still practicing the concepts of the invention, as set forth previously. All such modifications and variations are intended to be included herein within the scope of the present invention, as defined in the claims that follow.

In the claims set forth hereinafter, the structures, materials, acts, and equivalents of all "means" elements and "logic" elements are intended to include any structures, materials, or acts for performing the functions specified in connection with said elements.

The following is claimed:

1. A method for efficiently coding subband data, comprising the steps of:
    generating a plurality of subband image planes from an input signal, each of said planes having subbands of pixels;
    generating a plurality of stage quantizer output symbols;
    providing a plurality of probability tables, each having a list of values and corresponding code words; and
    conditioning said stage quantizer output symbol associated with a pixel by selecting a particular probability table for said symbol based upon a vector of values of conditioning symbols which correspond to a value of an adjacent pixel in its own subband, and by entropy coding said pixel using said particular probability table.

2. The method of claim 1, further comprising the steps of:
    generating a subband image plane corresponding with each of three different color planes; and
    when selecting said particular probability table for said symbol based upon a vector of values of conditioning symbols which correspond to a value of an adjacent pixel in its own subband, also considering a corresponding pixel in a neighboring subband associated with said pixel.

3. The method of claim 1, further comprising the steps of:
    generating a subband plane; and
    when selecting said particular probability table for said symbol based upon a vector of values of conditioning symbols which correspond to a value of an adjacent pixel in its own subband, also considering a corresponding pixel in a different image plane of said subband image plane.

4. The method of claim 1, further comprising the steps of:
    generating a subband plane; and
    when selecting said particular probability table for said symbol based upon a vector of values of conditioning symbols which correspond to a value of an adjacent pixel in its own subband, also considering a different quantizer stage symbol for said pixel in said subband image plane.

5. The method of claim 1, further comprising the steps of:
    generating a subband plane; and
    when selecting said particular probability table for said symbol based upon a vector of values of conditioning symbols which correspond to a value of an adjacent pixel in its own subband, also considering a corresponding pixel in a neighboring subband associated with said pixel, a corresponding pixel in a different image plane of said subband image plane, and a corresponding value of a different quantizer stage symbol for said pixel in said subband image plane.

6. The method of claim 5, further comprising the step of selecting a predetermined set of neighboring pixels by performing a training session with sample data, said neighboring pixels including a corresponding pixel in a neighboring subband associated with said pixel, said corresponding pixel in said different subband of said subband plane associated with said pixel, said corresponding pixel in a different image plane of said subband image plane associated with said pixel, and said corresponding value of a different quantizer stage symbol for said pixel in said subband image plane, said predetermined set of neighboring pixels chosen from a region of support formed by the set of all stage quantizer symbols considered while entropy coding said pixel.

7. The method of claim 1, further comprising the step of entropy coding said pixel by quantizing said pixel with the output of a successive stage quantizer.

8. The method of claim 7, wherein said successive stage quantizer is a successive stage vector quantizer.

9. The method of claim 7, wherein said successive stage quantizer is a successive stage scalar quantizer.

10. The method of claim 7, wherein said output of said successive stage quantizer is generated independently of decisions made by previous stage quantizers.

11. The method of claim 7, wherein said output of said successive stage quantizer is generated using multipath searching.

12. The method of claim 11, wherein said multipath searching is dynamic and comprises the steps of:
    finding the M best stage quantizer symbol values; selecting a different value of M for each stage quantizer and each subband pixel based upon a symbol value and the value of a predetermined threshold; and
    determining a path for each pixel through a sequence of stage quantizers that gives a lowest overall distortion.

13. The method of claim 1, wherein said particular probability table is generated by a finite state machine which supplies said particular probability table to an entropy coder.

14. A method for efficiently coding subband data, comprising the steps of:

generating a plurality of subband image planes from an input signal, each of said planes having subbands of pixels;

generating a plurality of stage quantizer output symbols;

providing a plurality of probability tables, each having a list of values and corresponding code words; and conditioning said stage quantizer output symbol associated with a pixel by selecting a particular probability table for said symbol based upon a vector of values of conditioning symbols which correspond to a value of a corresponding pixel in a neighboring subband associated with said pixel, and by entropy coding said pixel using said particular probability table.

15. A method for efficiently coding subband data, comprising the steps of:

generating a plurality of subband image planes from an input signal, each of said planes having subbands of pixels;

generating a plurality of stage quantizer output symbols;

providing a plurality of probability tables, each having a list of values and corresponding code words; and conditioning said stage quantizer output symbol associated with a pixel by selecting a particular probability table for said symbol based upon a vector of values of conditioning symbols which correspond to a value of a corresponding pixel in a different image plane of said subband image plane, and by entropy coding said pixel using said particular probability table.

16. A method for efficiently coding subband data, comprising the steps of:

generating a plurality of subband image planes from an input signal, each of said planes having subbands of pixels;

generating a plurality of stage quantizer output symbols;

providing a plurality of probability tables, each having a list of values and corresponding code words; and conditioning said stage quantizer output symbol associated with a pixel by selecting a particular probability table for said symbol based upon a vector of values of conditioning symbols which correspond to a value of a different quantizer stage symbol for said pixel within said subband image plane, and by entropy coding said pixel using said particular probability table.

17. A method for efficiently coding subband data, comprising the steps of:

(a) generating a plurality of subband image planes from an input signal, each of said image planes having subbands of pixels;

(b) generating a plurality of stage quantizer output symbols;

(c) providing a plurality of probability tables, each having a list of values and corresponding code words; and (d) conditioning said stage quantizer output symbol associated with a pixel by performing the following steps:

(1) selecting a particular probability table for said pixel based upon a predetermined set of neighboring pixels, said neighboring pixels including any combination of:

(aa) an adjacent pixel in its own subband image plane;

(bb) a corresponding pixel in a neighboring subband associated with said pixel;

(cc) a corresponding pixel in a different image plane of said subband image plane; and (dd) a corresponding value of a different quantizer stage symbol for a pixel in said subband image plane; and (2) entropy coding said pixel using said particular probability table.

18. The method of claim 17, further comprising the steps of generating a subband image plane corresponding with each of three different colors.

19. The method of claim 17, further comprising the step of selecting said predetermined set of neighboring pixels by performing a training session with sample data, prior to steps (a), (b), (c) and (d).

20. The method of claim 17, further comprising the step of entropy coding said pixel by entropy coding said stage quantizer output symbol that represents said pixel.

21. The method of claim 17, wherein said particular probability table is generated by a finite state machine which supplies said particular probability table to an entropy coder.

22. A system for efficiently coding subband data, comprising:

means for generating a plurality of subband planes from an input signal, each of said planes having subbands of pixels;

means for generating a plurality of stage quantizer output symbols;

a plurality of probability tables, each having a list of values and corresponding code words; and means for conditioning said stage quantizer output symbol associated with a pixel by selecting a particular probability table for said symbol based upon a vector of values of conditioning symbols which correspond to a value of an adjacent pixel in its own subband, and by entropy coding said pixel using said particular probability table.

23. The system of claim 22, further comprising:

means for generating a subband image plane corresponding with each of three different color planes; and when selecting said particular probability table for said symbol based upon a vector of values of conditioning symbols which correspond to a value of an adjacent pixel in its own subband, also considering a corresponding pixel in a neighboring subband associated with said pixel.

24. The system of claim 22, further comprising:

means for generating a subband plane; and when selecting said particular probability table for said symbol based upon a vector of values of conditioning symbols which correspond to a value of an adjacent pixel in its own subband, also considering a corresponding pixel in a neighboring subband associated with said pixel, a corresponding pixel in a different image plane of said subband image plane, and a corresponding value of a different quantizer stage symbol for said pixel in said subband image plane.

25. The system of claim 24, further comprising means for selecting a predetermined set of neighboring pixels by performing a training session with sample data, said neighboring pixels including a corresponding pixel in a neighboring subband associated with said pixel, said corresponding pixel in said different subband of said subband plane associated with said pixel, said corresponding pixel in a different image plane of said subband image plane associated with said pixel, and said corresponding value of a different quantizer stage symbol for said pixel in said subband image plane, said predetermined set of neighboring pixels chosen from a region of support formed by the set of all stage quantizer symbols considered while entropy coding said pixel.

26. The system of claim 22, further comprising means for entropy coding said pixel by quantizing said pixel with the output of a successive stage quantizer.

27. The system of claim 26, wherein said successive stage quantizer is a successive stage vector quantizer.

28. The system of claim 26, wherein said successive stage quantizer is a successive stage scalar quantizer.

29. The system of claim 26, wherein said output of said successive stage quantizer is generated independently of decisions made by previous stage quantizers.

30. The system of claim 26, wherein said output of said successive stage quantizer is generated using multipath searching.

31. The system of claim 30, wherein said multipath searching is dynamic and comprises:
   means for finding the M best stage quantizer symbol values;
   means for selecting a different value of M for each stage quantizer and each subband pixel based upon a symbol value and the value of a predetermined threshold; and
   means for determining a path for each pixel through a sequence of stage quantizers that gives a lowest overall distortion.

32. The system of claim 22, wherein said particular probability table is generated by a finite state machine which supplies said particular probability table to an entropy coder.

33. A system for efficiently coding subband data, comprising:
   means for generating a plurality of subband planes from an input signal, each of said planes having subbands of pixels;
   means for generating a plurality of stage quantizer output symbols;
   a plurality of probability tables, each having a list of values and corresponding code words; and
   means for conditioning said stage quantizer output symbol associated with a pixel by selecting a particular probability table for said symbol based upon a vector of values of conditioning symbols which correspond to a value of a value of a corresponding pixel in a neighboring subband associated with said pixel, and by entropy coding said pixel using said particular probability table.

34. A system for efficiently coding subband data, comprising:
   means for generating a plurality of subband planes from an input signal, each of said planes having subbands of pixels;
   means for generating a plurality of stage quantizer output symbols;
   a plurality of probability tables, each having a list of values and corresponding code words; and
   means for conditioning said stage quantizer output symbol associated with a pixel by selecting a particular probability table for said symbol based upon a vector of values of conditioning symbols which correspond to a value of a value of a corresponding pixel in a different image plane of said subband image plane, and by entropy coding said pixel using said particular probability table.

35. A system for efficiently coding subband data, comprising:
   means for generating a plurality of subband planes from an input signal, each of said planes having subbands of pixels;
   means for generating a plurality of stage quantizer output symbols;
   a plurality of probability tables, each having a list of values and corresponding code words; and
   means for conditioning said stage quantizer output symbol associated with a pixel by selecting a particular probability table for said symbol based upon a vector of values of conditioning symbols which correspond to a value of a different quantizer stage symbol for said pixel within said subband image plane, and by entropy coding said pixel using said particular probability table.

36. A system for efficiently coding subband data, comprising:
   (a) means for generating a plurality of subband image planes from an input signal, each of said planes having subbands of pixels;
   (b) means for generating a plurality of stage quantizer output symbols;
   (c) a plurality of probability tables, each having a list of values and corresponding code words; (d) means for conditioning said stage quantizer output symbol associated with a pixel;
   (e) means for selecting a particular probability table for said pixel based upon a predetermined set of neighboring pixels, said neighboring pixels including (1) an adjacent pixel in its own subband; (2) a corresponding pixel in a neighboring subband associated with said pixel; (3) a corresponding quantizer stage symbol in a pixel within said subband image plane; and (4) a corresponding value of a different quantizer stage symbol for a pixel in said subband image plane; and
   (f) means for entropy coding said pixel using said particular probability table.

37. A computer readable medium having a program for efficiently coding subband data, the program comprising:
   means for generating a plurality of subband planes from an input signal, each of said planes having subbands of pixels;
   means for generating a plurality of stage quantizer output symbols;
   a plurality of probability tables, each having a list of values and corresponding code words; and
   means for conditioning said stage quantizer output symbol associated with a pixel by selecting a particular probability table for said symbol based upon a vector of values of conditioning symbols which correspond to a value of an adjacent pixel in its own subband, and by entropy coding said pixel using said particular probability table.

38. A computer readable medium having a program for efficiently coding subband data, the program comprising:
   means for generating a plurality of subband planes from an input signal, each of said planes having subbands of pixels;
   means for generating a plurality of stage quantizer output symbols;
   a plurality of probability tables, each having a list of values and corresponding code words; and
   means for conditioning said stage quantizer output symbol for a pixel by selecting a particular probability table for said symbol based upon a vector of values of conditioning symbols which correspond to a value of a corresponding pixel in a neighboring subband associated with said pixel.

39. A computer readable medium having a program for efficiently coding subband data, the program comprising:

means for generating a plurality of subband planes from an input signal, each of said planes having subbands of pixels;

means for generating a plurality of stage quantizer output symbols;

a plurality of probability tables, each having a list of values and corresponding code words; and means for conditioning said stage quantizer output symbol for a pixel by selecting a particular probability table for said symbol based upon a vector of values of conditioning symbols which correspond to a value of a corresponding pixel in a different image plane of said subband image plane.

40. A computer readable medium having a program for efficiently coding subband data, the program comprising:

means for generating a plurality of subband planes from an input signal, each of said planes having subbands of pixels;

means for generating a plurality of stage quantizer output symbols;

a plurality of probability tables, each having a list of values and corresponding code words; and means for conditioning said stage quantizer output symbol for a pixel by selecting a particular probability table for said symbol based upon a vector of values of conditioning symbols which correspond to a value of a different quantizer stage symbol for said pixel within said subband image plane.

41. A computer readable medium having a program for efficiently coding subband data, the program comprising:

(a) means for generating a plurality of subband planes from an input signal, each of said planes having subbands of pixels;

(b) means for generating a plurality of stage quantizer output symbols;

(c) a plurality of probability tables, each having a list of values and corresponding code words; (d) means for conditioning said stage quantizer output symbol associated with a pixel;

(e) means for selecting a particular probability table for said pixel based upon a predetermined set of neighboring pixels, said neighboring pixels including (1) an adjacent pixel in its own subband; (2) a corresponding pixel in a neighboring subband associated with said pixel; (3) a corresponding quantizer stage symbol in a pixel within said subband image plane; and (4) a corresponding value of a different quantizer stage symbol for a pixel in said subband image plane; and (f) means for entropy coding said pixel using said particular probability table.

\* \* \* \* \*